United States Patent [19]
Belart

[11] 3,978,669
[45] Sept. 7, 1976

[54] SERVO-POWER-ASSISTED HYDRAULIC BRAKE-ACTUATING ARRANGEMENT

[75] Inventor: Juan Belart, Walldorf, Germany

[73] Assignee: ITT Industries, Inc., New York, N.Y.

[22] Filed: Oct. 3, 1975

[21] Appl. No.: 619,281

[30] Foreign Application Priority Data
Nov. 12, 1974 Germany............................ 2453573

[52] U.S. Cl. ............................... 60/549; 91/391 R; 188/345
[51] Int. Cl.² ........................................ B60T 13/20
[58] Field of Search ...................... 60/548, 549–551, 60/413; 91/391 R; 303/21 F; 188/345, 358, 359, 348

[56] References Cited
UNITED STATES PATENTS

| | | | |
|---|---|---|---|
| 2,282,472 | 5/1942 | Herman et al. ....................... | 60/549 |
| 2,472,695 | 6/1949 | Chouings ........................... | 60/549 X |
| 3,064,431 | 11/1962 | Schnell ................................ | 60/548 |
| 3,751,912 | 8/1973 | Bach .................................... | 60/548 |

FOREIGN PATENTS OR APPLICATIONS

| | | | |
|---|---|---|---|
| 1,126,573 | 11/1956 | France ................................. | 60/549 |

Primary Examiner—Martin P. Schwadron
Assistant Examiner—H. Burks, Sr.
Attorney, Agent, or Firm—John T. O'Halloran; Alfred C. Hill

[57] ABSTRACT

The arrangement comprises a brake valve for controlling servo pressure which is proportional to the actuating force at a brake pedal and first and second displacement pistons each actuating a different brake circuit. The second displacement piston is actuated on its rear surface under control of the brake valve by the servo pressure introduced into a chamber behind the second displacement piston. The chamber is defined by the second displacement piston and an ancillary piston in a common housing bore. The ancillary piston has connected to its surface remote from the second displacement piston a tappet which in its end position rests against a housing stop. The first displacement piston is actuated by a balance arm, which is pivotably supported by the first displacement piston and the tappet, and a force transmitting member which is displaced by servo pressure when the servo pressure is present. The force transmitting member, in the event of failure of servo pressure, is actuated by the driver's pedal effort directly to actuate the balance arm and, hence, the first and second displacement pistons.

15 Claims, 3 Drawing Figures

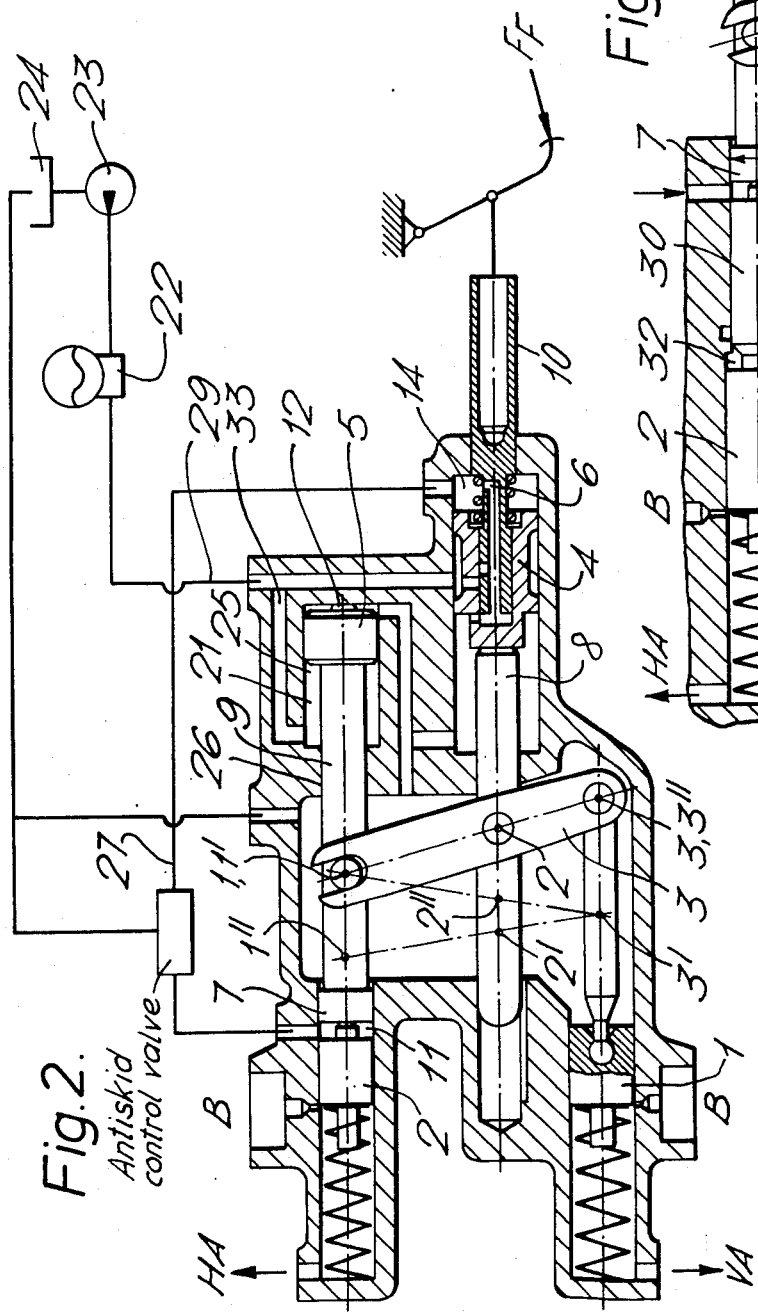
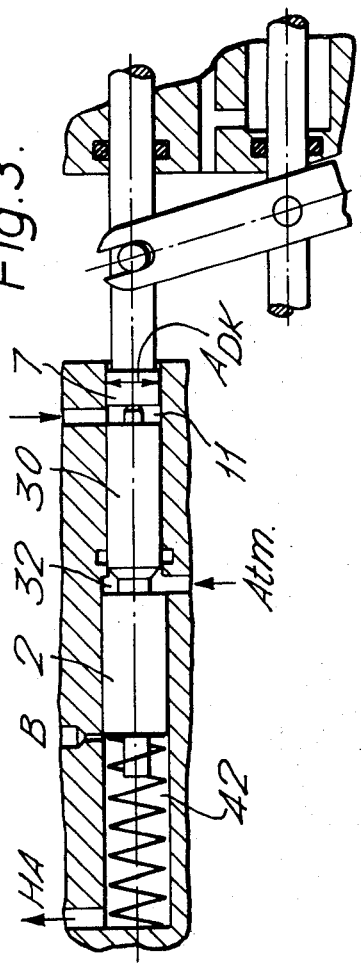

SERVO-POWER-ASSISTED HYDRAULIC BRAKE-ACTUATING ARRANGEMENT

BACKGROUND OF THE INVENTION

This invention relates to a servo-power-assisted hydraulic brake-actuating arrangement comprising a brake valve for controlling servo pressure which is proportional to the actuating force, and a first and second displacement piston, each defining a static fluid circuit, with the second displacement piston being actuated on its rear end by the servo pressure introduced into a chamber behind the second displacement piston under control of the brake valve.

Such a brake-actuating arrangement is known from the article "Hydraulic Brake Boosting and Anti-Skid Control for Automotive Vehicles" which appeared on pages 375 to 381 of the journal "Automobiltechnische Zeitschrift" 75 (1973) 10. In the brake-actuating arrangement known from Figure 8 of the above-cited article, a brake valve controls servo pressure which is proportional to the force the vehicle operator applies to the brake petal, by taking fluid from a fluid accumulator. The servo pressure is used for actuating two displacement pistons each of which defines a static fluid circuit, so that a brake pressure proportional to the servo pressure is generated in each fluid circuit.

In addition, in this known brake-actuating arrangement, one of the two displacement pistons is mechanically actuatable by the vehicle operator directly if the accumulator pressure fails, without causing substantial loss of pedal travel. If such a case occurs, brake pressure builds up only in one of the two fluid circuits. This fluid circuit is preferably connected to the wheel brakes of the front axle which provides, as a rule, the higher braking force.

The fact that the known brake-actuating arrangement deliberately does not make use of an emergency activation of the second fluid circuit is based on the realization that it is not possible in heavy vehicles to build up in both fluid circuits a pressure sufficiently high to achieve a full braking effect by means of the pedal force alone, thereby obviating the need for an emergency activation of both fluid circuits.

However, when using servo-power-assisted hydraulic brake-actuating arrangements in medium-heavy to light vehicles, the force the driver is able to apply would suffice to build up a relatively high pressure in both brake circuits, the more so since, as a rule, the driver will depress the pedal with considerably more effort than usual, reacting with shock due to the reduced brake performance. However, this may result in an excessively high pressure being built up in the still actuatable fluid circuit which causes overbraking of the associated vehicle axle. Thus, in the event of servo power boost being inoperative, the brake performance will also in light vehicles be limited to a value achievable by but one vehicle axle, although the force the driver is able to exert on the pedal would permit a stronger braking to be achieved.

Practically the same applies if a heavy vehicle is braked on a road surface having a very low coefficient of friction, for instance, on an icy road. Also in this case it will be more advantageous if pressure, though relatively low, is built up in both fluid circuits so that both axles of the vehicle are slowed down. If pressure were built up in but one fluid circuit which would act on one axle only, the pressure, though being higher, could not be made full use of to achieve an optimum braking of the vehicle due to the low coefficient of friction.

In the special case where the vehicle is braked on a surface having a low coefficient of friction it is, however, essential that the brake force continue to be distributed, according to the requirements of the vehicle, among the two vehicle axles even during emergency braking conditions in the absence of servo-power boost to ensure an optimum braking under the prevailing conditions.

However, from this result particular difficulties if in a brake-actuating arrangement of the type initially referred to an emergency braking is to be provided for both brake circuits. Namely, it is not possible in this system to just rigidly connect both displacement pistons with the brake pedal when the servo force has failed. The necessary brake-effort distribution would not be ensured under emergency braking conditions. To ensure this, means would have to be provided to achieve distribution of the driver's pedal effort among the two displacement pistons in accordance with the required distribution ratio. The provision of such means, however, entails a further difficulty in that only part of the actuating travel is to be made use of with the servo power available, whereas the complete travel is to be utilized when the servo force has failed. If in the design of such a brake-actuating arrangement all these requirements were fulfilled in an obvious manner, provided such fulfillment is at all possible, an extremely complicated structure would result which would substantially increase the risk that this brake-actuating arrangement is prone to malfunction. Besides, such a brake-actuating arrangement would hardly allow economy of manufacture.

SUMMARY OF THE INVENTION

It is, therefore, an object of this invention to provide a servo-power-assisted hydraulic brake-actuating arrangement for a brake system having two separate static fluid circuits within this arrangement permitting different volume or pressure requirements of the two fluid circuits, which are in a predetermined ratio, to be taken into account in different vehicles, by applying simple measures which do not substantially increase the cost of manufacture, and wherein both fluid circuits can be activated in the event of failure of the servo force by utilizing the maximum possible travel by means of pedal effort, with the volume or pressure ratio not changing.

In an improvement of this invention, another object is to provide an antiskid control in one of the two brake circuits using the simplest means.

A feature of the present invention is the provision of a servo-power-assisted hydraulic brake-actuating arrangement comprising: a housing; a first bore disposed in a given plane within the housing having a first axis; a second bore disposed in the given plane within the housing having a second axis parallel with the first axis; a third bore disposed in the given plane within the housing having a third axis parallel with the first and second axes; a source of servo pressure; a first displacement piston disposed in the first bore coaxial of the first axis to actuate a first brake circuit; a second displacement piston disposed in the second bore coaxial of the second axis to actuate a second brake circuit; an ancillary piston disposed in the second bore coaxial of the second axis and in tandem relation with the second displacement piston, the ancillary piston and the second displacement piston being interconnected and forming in the second bore a first chamber; a tappet disposed coaxial of the second axis connected to the ancillary piston remote from the second displacement piston and extending in its end position to a housing stop remote from the second displacement piston; a brake valve disposed in the third bore coaxial of the third axis, the brake valve being connected to the source and a brake pedal to couple the servo pressure to the first chamber for acutation of the second displacement piston when the brake pedal is actuated; a balance arm disposed in the housing pivotably connected at opposite ends thereof to the first displacement piston and the tappet; and a force transmitting member disposed in the third bore coaxial of the third axis and in tandem relation with the brake valve, the force transmitting member being connected to the balance arm intermediate the opposite ends to actuate the balance arm which actuates the first displacement piston when the servo pressure is present and which actuates the first and second displacement piston by a driver's brake pedal effort directly in the event of failure of the servo pressure.

The above feature of this invention enables the achievement in a most simple manner to provide a brake-actuating arrangement allowing brake-force distribution to be easily adapted to the various types of car by modifying the diameter ratios between the two displacement pistons, and the length ratios between the levers of the balance arm, without necessitating substantial modifications of the individual components. In this manner, the desired brake-force distribution will be achieved in the same manner, irrespective of whether or not the servo force is available, permitting full use to be made of the maximum possible pedal travel in the event of failure of the servo force.

Another feature of this invention is the provision of a brake valve having a control housing slidably sealed in a bore which is actuated by controlled servo pressure in a pedal-side annular chamber and directly supported against the force-transmitting member at the opposite end thereof. This arrangement permits the constructional expenditure and the size of the whole brake-actuating arrangement to be kept small, since the control housing is at the same time designed as a piston bearing against the force-transmitting member and actuated by the servo force. Since this arrangement provides for displacement of the control housing together with the force-transmitting member, the necessity for a sophisticated travel simulator for the brake valve is obviated. The driver will be provided with the necessary brake feel by the reaction force the servo pressure exerts on a control piston, and by the displacement travel of the control housing.

Still another feature of this invention is that the balance arm is disposed in a chamber internal to a housing between the brake valve and the two displacement pistons, with this chamber communicating on its upper side with a reservoir. By this arrangement all movable parts, in particular the pivots at the balance arm, are permanently immersed in fluid which provides a good lubrication of these parts. Contamination and faults thereby incurred are thus excluded in a most simple manner.

A further feature of this invention is to arrange the force-transmitting member on opposite sides of the balance arm in coaxial bores which are parallel to the two displacement pistons. By this arrangement interfering forces, which would be caused by an inclined position of the balance arm, will not become effective, and jamming of the force-transmitting member will be eliminated. This arrangement prohibits further that the lever lengths of the balance arm become changed due to a lateral shift of the balance arm.

Still a further feature of this invention is the provision of a tappet having a hold-back piston remote from the second displacement piston, the hold-back piston defining an annular chamber which is provided between an ancillary piston and the hold-back piston and communicates direct with a power source providing the servo pressure. Thus, it is ensured, even if the diameter ratios of the displacement pistons and the lever lengths of the balance arm relative to the diameter of the ancillary piston are unfavorable, that the ancillary piston will not be displaced away from a housing stop when accumulator pressure is available and change the position of the pivot point of the balance arm at the tappet. The actuation face of the ancillary piston can thus be selected freely, independent of the other dimensions.

Another feature of this invention is to dispose the hold-back piston at the tappet end remote from the second displacement piston slidably sealed in a bore, and to introduce the tappet into the bore in a slidably sealed relation with an opening, with the opening having a cross-sectional area smaller than the bore. This arrangement provides a guiding also for the tappet at either end without necessitating substantial additional expenditure.

Still another feature of this invention is to provide a valve in a fluid line through which the brake valve feeds the controlled servo pressure for introduction into the chamber between the second displacement piston and the ancillary piston, this valve serving to control the servo pressure introduced into the chamber. This affords a simple means for providing an antiskid control in the fluid circuit defined by the second displacement piston, without necessitating means causing the antiskid control to be disabled in the case of an emergency actuation, i.e., in the event of failure of the servo pressure, because the control is then ineffective anyway. Further, this arrangement obviates the need for sophisticated arrangements providing for compensation of the fluid withdrawn by the antiskid control.

Still a further feature of this invention is to provide an intermediate piston disposed between the ancillary piston and the second displacement piston, the intermediate piston being actuated by the servo pressure in the chamber in the direction of the second displacement piston and being supported by the latter, with an intermediate chamber defined between the second displacement piston and the intermediate piston communicating with atmosphere. The static fluid circuits associated with the brakes are thereby completely separated from the fluid circuit of the servo power source. This makes it possible without difficulty to combine the fluid circuit of the servo power source with another servo circuit of the vehicle which uses pressure fluid normally not suitable for operation of the actual brake. In this manner, fluid from the servo power source is never allowed to flow into the fluid circuits of the actual brake. Further, this arrangement ensures that a damaged seal of the second displacement piston is recognized at once and does not lead to a catastrophe in combination with another fault of the whole system.

A further feature of this invention is that the second displacement piston and the intermediate piston are designed as one single piston having an annular groove providing the intermediate chamber. This arrangement affords a particularly simple manufacture and reduces the total number of the individual components.

BRIEF DESCRIPTION OF THE DRAWING

Above-mentioned and other features and objects of this invention will become more apparent by reference to the following description taken in conjunction with the accompanying drawing, in which:

FIG. 2 is a longitudinal cross-sectional view of a second embodiment of the brake-actuating arrangement in accordance with the principles of the present invention incorporating an antiskid control; and FIG. 3 is a fragmentary longitudinal cross-sectional view of a third embodiment of the brake-actuating arrangement in accordance with the principles of the present invention for such applications where the servo circuit and the actual brake circuits use different fluids.

DESCRIPTION OF THE PREFERRED EMBODIMENTS

Figure 1:
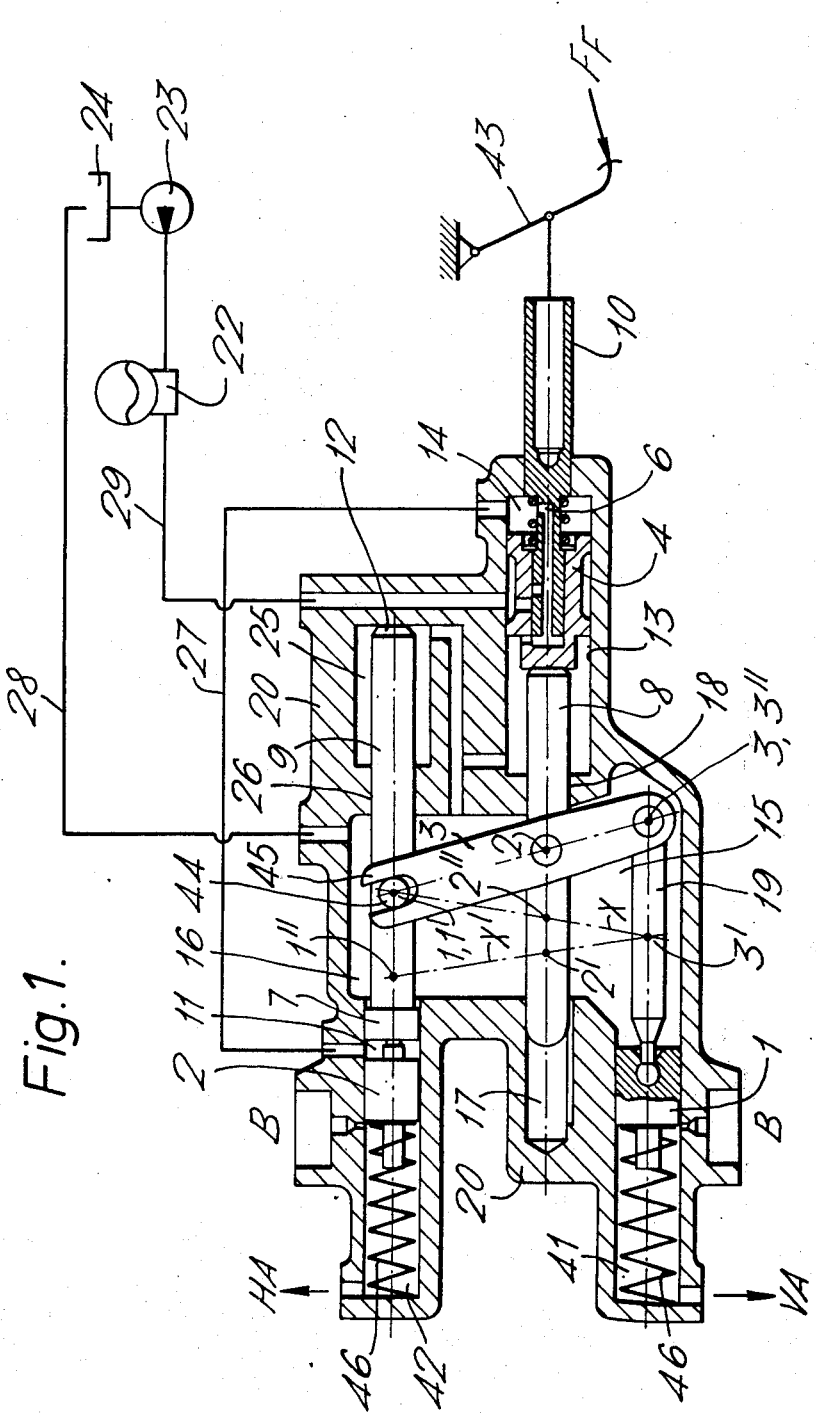
FIG. 1 is a longitudinal cross-sectional view of a first embodiment of the brake-actuating arrangement in accordance with the principles of this invention.

In FIG. 1, in a housing 20, there are provided bores 41 and 42 forming a simple static master cylinder. Bore 42 is associated with the rear-axle brake circuit, and bore 41 with the front-axle brake circuit. A first displacement piston 1 is disposed in bore 41, and a second displacement piston 2 is disposed in bore 42. A third bore 13, which lies in a common plane with bores 41 and 42, is disposed between bores 41 and 42 and receives in a slidably sealed relation a control housing 4. In control housing 4, a control spool 6 is provided which is rigidly connected with an actuating member 10. In bore 13, control housing 4 defines a pedal-side annular chamber 14 extending about the actuating member 10. Control channels in spool 6 control, dependent upon the relative positions of spool 6 and control housing 4, a line 29 connecting the annular chamber 14 with a fluid accumulator 22, or with an inner chamber 15 which communicates with a reservoir 24. A force which is proportional to the controlled servo pressure in chamber 14 acts in a manner known per se against the actuating force the driver applies by depressing the brake pedal 43. The controlled servo pressure in chamber 14 acts upon control housing 4 in the actuating direction of brake pedal 43. On its end remote from annular chamber 14, control housing 4 bears against a force-transmitting member 8 which is received by inner chamber 15 through an opening 18.

On its end remote from control housing 4, force-transmitting member 8 is guided in a bore 17 of housing 20, bore 17 being coaxial to opening 18. In inner chamber 15, a balance arm 3 is pivotably connected with force transmitting member 8 in the plane of the bores 41, 13, 17 and 42.

One end of balance arm 3 is pivotably connected to displacement piston 1 via a supporting member 19. The other end of balance arm 3 has a fork-shaped recess 45 which bears against a crossbolt 44 of the tappet 9. One end of tappet 9 is regidly connected with an ancillary piston 7 which is slidably sealed in bore 42. The other end of tappet 9 remote from ancillary piston 7 projects through an opening 26 into a bore 25, opening 26 and bore 25 being coaxial to bore 42. Tappet 9 is guided by means of opening 26 in the direction of displacement of ancillary piston 7. In its end piston, tappet 9 firmly rests against a housing stop 12 in bore 25.

From annular chamber 14, a fluid line 27 leads to chamber 11. In the inoperative position of the brake-actuating arrangement, the two displacement pistons 1 and 2 are shifted to their end positions in the direction of brake pedal 43 by means of restoring springs 46 arranged in bores 41 and 42. Control housing 4 supported via balance arm 3 is thus equally displaced into its end position. On an upper side 16, inner chamber 15 communicates with a reservoir 24 via a fluid line 28. When so required, a pump 23 will supply pressure fluid from reservoir 24 into fluid accumulator 22 which is connected to the brake valve 4 and 6 via a supply line 29.

The operation of the inventive brake-actuating arrangement of FIG. 1 is as follows:

In the normal position of the brake-actuating arrangement, all parts are in their illustrated positions due to the action of springs 46.

If accumulator pressure is available and brake pedal 43 is depressed, thereby displacing spool 6 in control housing 4, accumulator 22 will communicate with annular chamber 14 until a controlled servo pressure is introduced into chamber 14 which is proportional to the force applied via brake pedal 43, because this servo pressure acts against the force applied by depressing brake pedal 43. When the force applied to brake pedal 43 becomes less, the servo pressure in annular chamber 14 will cause spool 6 to be displaced in the opposite direction, thereby opening a connection between annular chamber 14 and inner chamber 15 and causing the servo pressure in chamber 14 to be likewise reduced in proportion to the reduced actuating force.

Via fluid line 27, the controlled servo pressure introduced into annular chamber 14 reaches chamber 11 where it acts on the second displacement piston 2, thereby shifting it in bore 42 and causing in the associated rear-axle fluid circuit a brake pressure to be built up which is proportional to the servo pressure. Simultaneously, the servo pressure in chamber 11 acts on ancillary piston 7, thereby holding tappet 9 connected therewith firmly against housing stop 12. The controlled servo pressure in annular chamber 14 acts at the same time upon control housing 4, thereby applying, via force-transmitting member 8, a force to balance arm 3 which is proportional to the servo pressure in chamber 14. This causes balance arm 3 to pivot about crossbolt 44 at the tappet 9, thereby likewise shifting in bore 41 the first displacement piston 1 via supporting member 19 until a corresponding brake pressure has developed in bore 41 which is supplied to the front axle brake circuit.

Therefore, due to the lever lengths of balance arm 3, the travel of the first displacement piston 1 is larger than the travel of force-transmitting member 8 and consequently of control housing 4. Because the force the driver applies always makes spool 6 follow the movement of control housing 4, an actuating travel is provided at brake pedal 43 which is predetermined by the displacement travel of control housing 4. The balance arm assumes a position which is indicated by the dotted lines x in the inner chamber 15.

However, in the event of failure of accumulator pressure, servo pressure cannot be supplied to chamber 14. In this case, spool 6 abuts against the bottom of control housing 4 whereby brake pedal 43 is mechanically rigidly connected with force-transmitting member 8. In addition servo pressure is not present in chamber 11 to actuate ancillary piston 7 in the direction of housing stop 12. Consequently, tappet 9 will not be held in its end position. Therefore, balance arm 3 distributes the force applied by the driver directly via force-transmitting member 8, to tappet 9 and supporting member 19 in relation to its lever lengths, thereby shifting both displacement pistons 1 and 2 in the operating direction. In doing so, balance arm 3 shifts itself into the position as indicated by the dotted lines $x'$ in inner chamber 15 which results in a larger displacement travel of force-transmitting member 8 than would be the case under normal operating conditions. Thus, the maximum possible travel of brake pedal 43 is made use of, something which is not the case under normal, conditions, i.e., with accumulator pressure and servo power boost available. If servo power boost is available, only part of the maximum possible travel of brake pedal 43 is used.

When adapting the inventive brake-actuating arrangement to the individual vehicle requirements, it is possible to vary the diameters of the two displacement pistons 1 and 2 and the effective lever lengths of balance arm 3. However, it must be assured that the ratio of the actuating surface of the second displacement piston 2 in chamber 11 relative to the effective actuating surface of control housing 4 in annular chamber 14 corresponds to the ratio of the lever lengths of balance arm 3. This ensures that the ratio of actuating forces acting on the two displacement pistons 1 and 2 will not change, no matter whether or not servo power boost is available. This arrangement permits free design of the first displacement piston which allows the brake-actuating arrangement to be easily adapted to different volume or pressure requirements of the two fluid circuits.

The embodiment of FIG. 2 largely corresponding to the embodiment of FIG. 1 and it will not be necessary to describe once again the parts which are identical in both FIGS. In fluid line 27 of FIG. 2, a control value for antiskid control is provided permitting reduction of the servo pressure supplied from annular chamber 14 to chamber 11. The antiskid control value is actuated by a known electronic antiskid control circuit responsive to the output of speed sensors associated with the vehicle wheels. Thus, the reduction of the servo pressure effective in chamber 11 causes the second displacement piston 2 to be relieved of pressure so that brake pressure will also be reduced in the associated fluid circuit. However, since at the same time the ancillary piston 7 will also be relieved of pressure, a hold-back piston 5 is provided to ensure that tappet 9 always remains in its end position when accumulator pressure is available. Hold-back piston 5 is rigidly connected with one end of tappet 9 remote from ancillary piston 7 and guided in bore 25 in a slidably sealed relation therewith. The annular chamber 21 thereby created is equally fluid-tight at opening 26 by means of tappet 9. Annular chamber 21 communicates, via a channel 33, with supply line 29 and consequently with accumulator 22. This provides an additional means for holding tappet 9 against stop 12 so that it is prevented, in any case, from moving away from stop 12 when accumulator pressure causing servo power boost to become effective is available. When accumulator pressure fails, hold-back piston 5 is also pressure-relieved so that the emergency actuation is performed for both fluid circuits in the manner described with respect to FIG. 1.

FIG. 3 illustrates a fragmentary longitudinal cross-section view of the brake-actuating arrangement of FIGS. 1 and 2, wherein an intermediate piston 30 is provided between the second displacement piston 2 and ancillary piston 7 to ensure safe separation of the pressure fluids. In this arrangement, chamber 11 is defined by ancillary piston 7 and intermediate piston 30 in bore 42. Second displacement piston 2 is thus mechanically shifted by the servo pressure prevailing in chamber 11 via intermediate piston 30 upon which the servo pressure acts. Between second displacement piston 2 and intermediate piston 30, an intermediate chamber 32 is provided which is connected to atmosphere.

It is thus ensured in a simple way that the servo actuating fluid is not allowed to enter the fluid circuit defined by second displacement piston 2 if a seal at second displacement piston 2 has become defective and that such a fault is not left undetected until the accumulator pressure fails, since, with accumulator pressure available, the absence of intermediate piston 30 would allow fluid to flow from chamber 11 into the circuit in front of second displacement piston 2. When using different fluids in the booster circuit and the wheel brake circuits, this would cause the two fluids to be mixed which would entail further damage.

While I have described above the principles of my invention in connection with specific apparatus it is to be clearly understood that this description is made only by way of example and not as a limitation to the scope of my invention as set forth in the objects thereof and in the accompanying claims.

I claim:
1. A servo-power-assisted hydraulic brake-actuating arrangement comprising:
   a housing;
   a first bore disposed in a given plane within said housing having a first axis;
   a second bore disposed in said given plane within said housing having a second axis parallel with said first axis;
   a third bore disposed in said given plane within said housing having a third axis parallel with said first and second axes;
   a source of servo pressure;
   a first displacement piston disposed in said first bore coaxial of said first axis to actuate a first brake circuit;
   a second displacement piston disposed in said second bore coaxial of said second axis to actuate a second brake circuit;
   an ancillary piston disposed in said second bore coaxial of said second axis and in tandem relation with said second displacement piston, said ancillary piston and said second displacement piston being interconnected and forming in said second bore a first chamber;
   a tappet disposed coaxial of said second axis connected to said ancillary piston remote from said second displacement piston and extending in its end position to a housing stop remote from said second displacement piston;
   a brake valve disposed in said third bore coaxial of said third axis, said brake valve being connected to said source and a brake pedal to couple said servo pressure to said first chamber for actuation of said second displacement piston when said brake pedal is actuated;

a balance arm disposed in said housing pivotably connected at opposite ends thereof to said first displacement piston and said tappet; and a force transmitting member disposed in said third bore coaxial of said third axis and in tandem relation with said brake valve, said force transmitting member being connected to said balance arm intermediate said opposite ends to actuate said balance arm with actuates said first displacement piston when said servo pressure is present and which actuates said first and second displacement pistons by a driver's brake pedal effort directly in the event of failure of said servo pressure.

2. An arrangement according to claim 1, wherein said brake valve includes a control housing disposed coaxial of said third axis and slidably sealed to the inner surface of said third bore, a control spool disposed within said control housing coaxial of said third axis connected to said brake pedal, and a pedal-side annular chamber disposed in said third bore connected to said source, said control housing being actuated by said servo pressure in said pedal-side annular chamber, the end of said control housing remote from said pedal-side annular chamber abutting against said force transmitting member.

3. An arrangement according to claim 1, wherein said balance arm is disposed in a second chamber within said housing, said second chamber being disposed between said first, second and third bores and in communication with a reservoir.

4. An arrangement according to claim 1, wherein said force transmitting member is supported in a fourth bore disposed in said housing coaxial of said third axis on the side of said balance arm adjacent said third bore and in a fifth bore disposed in said housing coaxial of said third axis on the side of said balance arm remote from said third bore.

5. An arrangement according to claim 1, wherein said tappet includes a hold-back piston adjacent said housing stop, said hold-back piston defining a second chamber disposed between said ancillary piston and said hold-back piston, said second chamber being in direct communication with said source.

6. An arrangement according to claim 5, wherein said second chamber is annular, said hold-back piston is slidably sealed to said second chamber, and said tappet enters said second chamber through a fourth bore disposed in said housing in a slidably sealed relation therewith, said fourth bore having a cross-sectional area smaller than the cross-sectional area of said second chamber.

7. An arrangement according to claim 6, further including a fluid line connected between said brake valve and said first chamber; and a valve disposed in said fluid line to control said servo pressure introduced into said first chamber.

8. An arrangement according to claim 1, further including an intermediate piston disposed in said second bore coaxial of said second axis intermediate said first chamber and said second displacement piston, said intermediate piston being actuated by said servo pressure in said first chamber in a direction toward said second displacement piston and being supported by said ancillary piston and said second displacement piston; and a second chamber disposed in said second bore between said second displacement piston and said intermediate piston, said second chamber being in communication with atmosphere.

9. An arrangement according to claim 8, wherein said second displacement piston and said intermediate piston are an integral member having an annular groove to provide said second chamber.

10. An arrangement according to claim 1, wherein said brake valve includes a control housing disposed coaxial of said third axis and slidably sealed to the inner surface of said third bore, a control spool disposed within said control housing coaxial of said third axis connected to said brake pedal, and a pedal-side annular chamber disposed in said third bore connected to said source, said control housing being actuated by said servo pressure in said pedal-side annular chamber, the end of said control housing remote from said pedal-side annular chamber abutting against said force transmitting member;

said balance arm is disposed in a second chamber within said housing, said second chamber being disposed between said first, second and third bores and in communication with a reservoir; and said force transmitting member is supported in a fourth bore in said housing coaxial of said third axis on the side of said balance arm adjacent said third bore and in a fifth bore disposed in said housing coaxial of said third axis on the side of aid balance arm remote from said third bore.

11. An arrangement according to claim 10, wherein said tappet includes a hold-back piston adjacent said housing stop, said hold-back piston defining a third chamber disposed between said ancillary piston and said hold-back piston, said third chamber being in direct communication with said source.

12. An arrangement according to claim 11, wherein said third chamber is annular, said hold-back piston is slidably sealed to said third chamber, and said tappet enters said third chamber through a sixth bore disposed in said housing in a slidably sealed relation therewith, said sixth bore having a cross-sectional area smaller than the cross-sectional area of said third chamber.

13. An arrangement according to claim 12, further including a fluid line connected between said pedal-size annular chamber and said first chamber; and a valve disposed in said fluid line to control said servo pressure introduced into said first chamber.

14. An arrangement according to claim 10, further including an intermediate piston disposed in said second bore coaxial of said second axis intermediate said first chamber and said second displacement piston, said intermediate piston being actuated by said servo pressure in said first chamber in a direction toward said second displacement piston and being supported by said ancillary piston and said second displacement piston; and a third chamber disposed in said second bore between said second displacement piston and said intermediate piston, said third chamber being in communication with atmosphere.

15. An arrangement according to claim 14, wherein said second displacement piston and said intermediate piston are an integral member having an annular groove to provide said third chamber.

* * * * *